United States Patent [19]

Ohno et al.

[11] Patent Number: 5,689,430
[45] Date of Patent: Nov. 18, 1997

[54] INTERNAL STATE DETERMINING APPARATUS

[75] Inventors: Yasuhiro Ohno; Yusaku Unno, both of Tokyo, Japan

[73] Assignee: Oki Electric Industry Co., Ltd., Tokyo, Japan

[21] Appl. No.: 546,374

[22] Filed: Oct. 20, 1995

[30] Foreign Application Priority Data

Oct. 27, 1994 [JP] Japan .................................. 6-263464

[51] Int. Cl.[6] .................................................. G01R 19/00
[52] U.S. Cl. ........................ 364/483; 364/481; 364/550; 364/551.01; 395/184.01; 395/185.03; 395/182.19; 395/182.21; 371/21.4
[58] Field of Search .................................. 364/483, 481, 364/550, 551.01, 579; 395/180, 182.19, 182.21, 183.21, 184.01, 185.03; 371/22.1, 21.4, 25.1; 323/901

[56] References Cited

U.S. PATENT DOCUMENTS

| | | |
|---|---|---|
| 4,872,107 | 10/1989 | Marple et al. .................... 395/182.21 |
| 4,956,807 | 9/1990 | Hosaka et al. .................... 395/182.21 |
| 5,155,730 | 10/1992 | Maida ............................... 395/182.21 |
| 5,400,341 | 3/1995 | Makino et al. .................... 395/182.21 |
| 5,511,161 | 4/1996 | Sato et al. ........................ 395/182.21 |
| 5,514,951 | 5/1996 | Halim et al. ..................... 323/901 |
| 5,524,206 | 6/1996 | Saito ................................. 395/182.21 |

Primary Examiner—Emanuel T. Voeltz
Assistant Examiner—Hal D. Wachsman
Attorney, Agent, or Firm—Rabin, Champagne & Lynt, P.C.

[57] ABSTRACT

An internal state determining apparatus according to the present invention includes at least one inner circuit, means for detecting a change in voltage supplied from an external device and outputting a detected signal in response to the change in voltage and internal state determining means for determining the inner circuit so as to fall into a predetermined state in response to the detected signal, as components that make up the internal state determining apparatus. Owing to the internal state determining apparatus having such a construction, when an IC card is activated in response to two types of different voltages, for example, an internal state of the IC card can be determined.

34 Claims, 6 Drawing Sheets

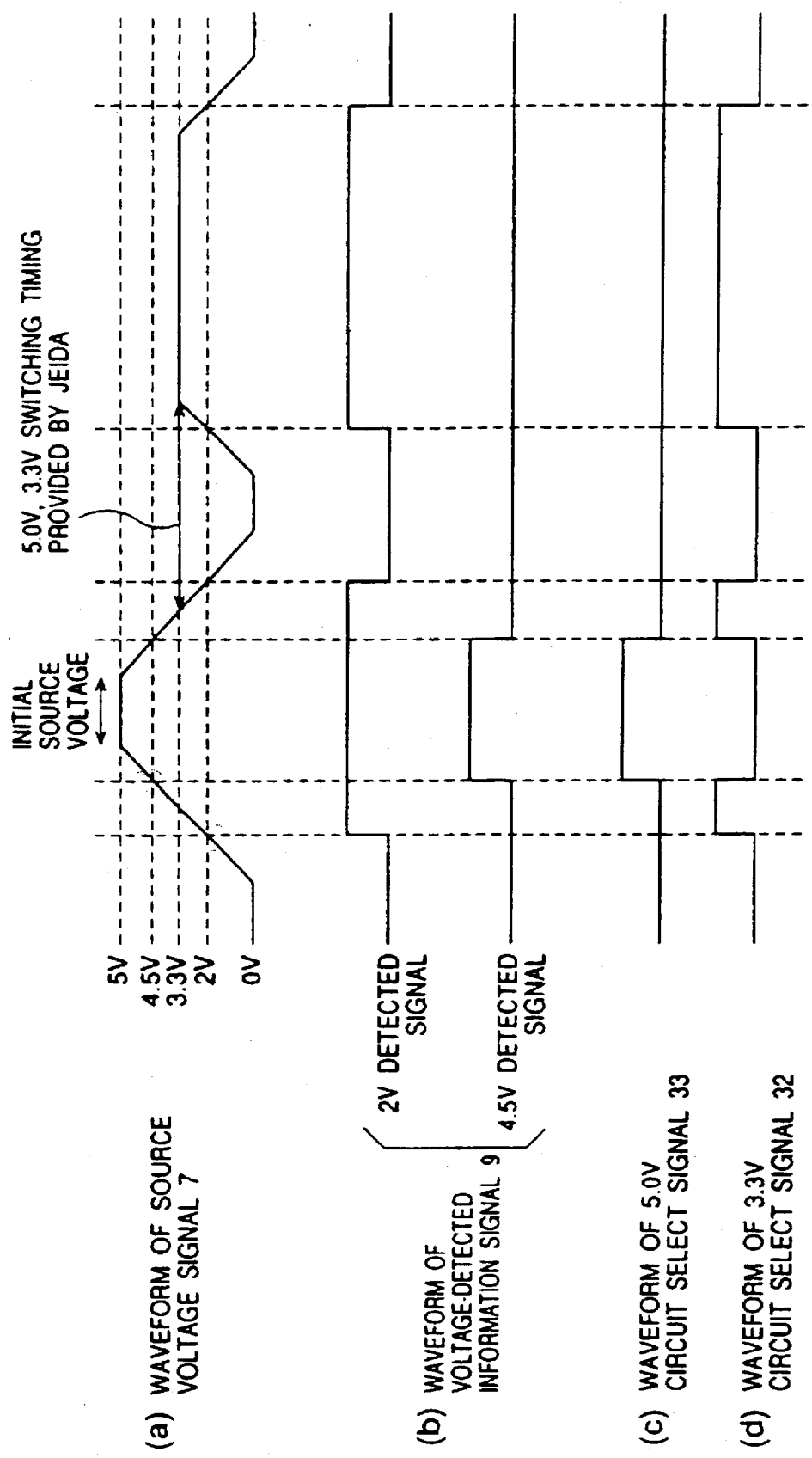

1

INTERNAL STATE DETERMINING APPARATUS

BACKGROUND OF THE INVENTION

1. Field of the Invention

This invention relates to an internal state determining apparatus applicable to an IC memory card, an I/O (Input/Output) card or the like.

2. Description of the Related Art

An IC card such as an IC memory card, an I/O card or the like, which is activated in response to two types of supply source voltage signals is now becoming pervasive. Standard specifications for this type of IC card have been fixed by the PCMCIA (PC Memory Card International Association) corresponding to the IC Memory Card Standard Association in the United States of America.

SUMMARY OF THE INVENTION

An object of the present invention is to provide an internal state determining apparatus capable of determining an internal state of an IC memory card or an I/O card without burdening a host-side device during a period in which the host-side device supplies predetermined power to the IC memory card or the I/O card based on an initial supply voltage signal.

According to one aspect of the invention, for achieving the above object, there is provided an internal state determining apparatus comprising: at least one inner circuit; detecting means for detecting a change in voltage supplied from an external device and outputting a detected signal in response to the change in voltage; and internal state determining means for determining the inner circuit so as to fall into a predetermined state in response to the detected signal.

BRIEF DESCRIPTION OF THE DRAWINGS

While the specification concludes with claims particularly pointing out and distinctly claiming the subject matter which is regarded as the invention, it is believed that the invention, the objects, features and advantages thereof will be better understood from the following description taken in connection with the accompanying drawings in which:

FIG. 8 is a waveform chart for describing the operation of the personal-computer system shown in FIG. 4.

DETAILED DESCRIPTION OF THE PREFERRED EMBODIMENTS

Preferred embodiments in which the present invention is applied to I/O cards used for personal-computer systems, will hereinafter be described with reference to the accompanying drawings.

[First Embodiment]

[Configuration of System]

Figure 1:
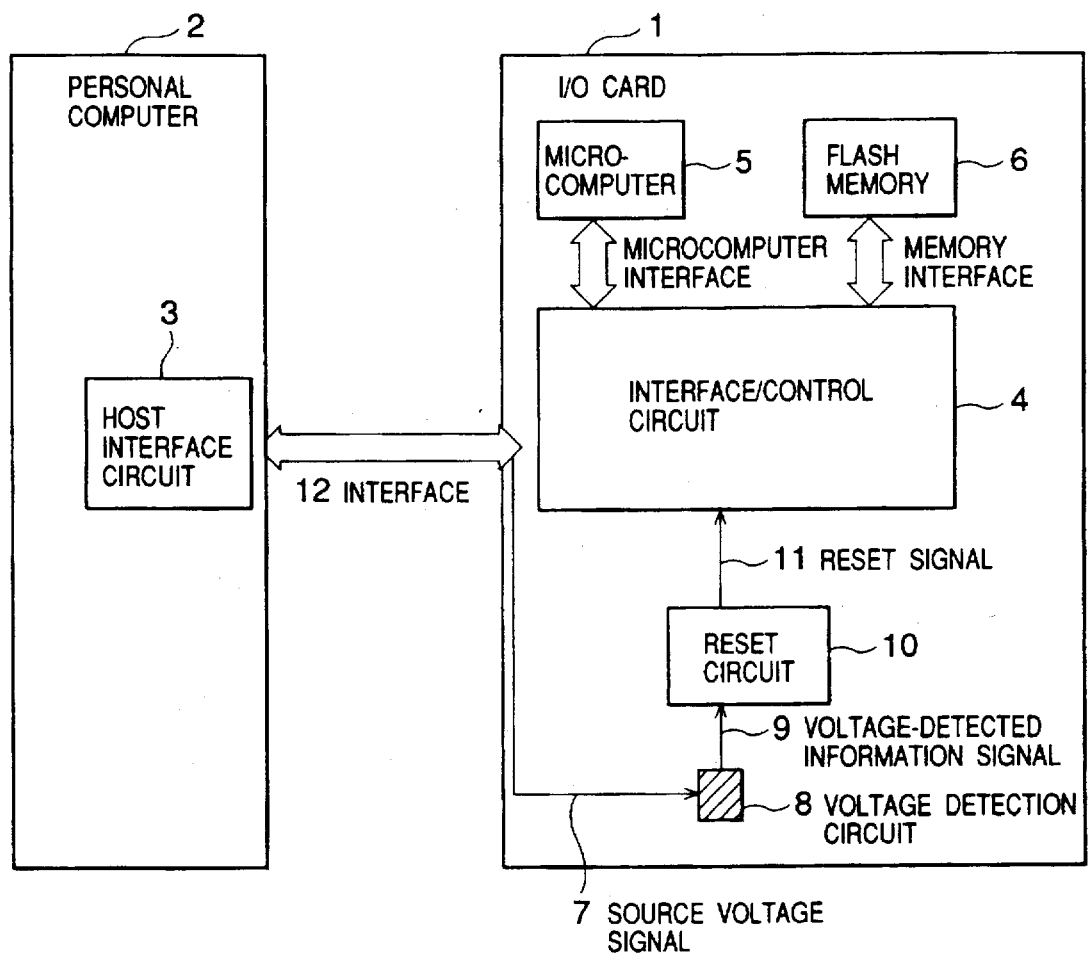
FIG. 1 is a functional configuration view of a personal-computer system showing a first embodiment.

FIG. 1 is a functional configuration view of a personal-computer system showing a first embodiment. Referring to FIG. 1, the present system principally comprises an I/O card 1 and a personal computer 2. An interface 12 electrically connects between the I/O card 1 and the personal computer 2.

Described specifically, the personal computer 2 includes a host interface circuit 3 for interfacing with the I/O card 1. On the other hand, the I/O card 1 is composed of an interface/control circuit 4, a microcomputer 5, a flash memory 6, a voltage detection circuit 8 and a reset circuit 10.

The I/O card 1 is characterized in configuration by the voltage detection circuit 8 and the reset circuit 10.

The interface/control circuit 4 and the host interface circuit 3 are electrically connected to each other by the interface 12. A source voltage signal 7 supplied to the interface/control circuit 4 from the host interface circuit 3 is applied to the voltage detection circuit 8 as a part of an interface signal for the interface 12.

A voltage-detected information signal 9 detected by the voltage detection circuit 8 is supplied to the reset circuit 10. The reset circuit 10 outputs a reset signal 11 in response to the voltage-detected information signal 9 as needed and supplies it to the interface/control circuit 4.

Further, the microcomputer 5 and the flash memory 6 are electrically connected to the interface/control circuit 4.

The microcomputer 5 is activated so as to control the entire circuitry of the I/O card 1 and control the writing and reading of memory data between the personal computer 2 and the flash memory 6 of the I/O card 1.

Described specifically, the voltage detection circuit 8 detects the voltage of the source voltage signal 7 and outputs a 2V detected signal 9a or a 4.5V detected signal 9b, followed by application to the reset circuit 10.

Figure 2:
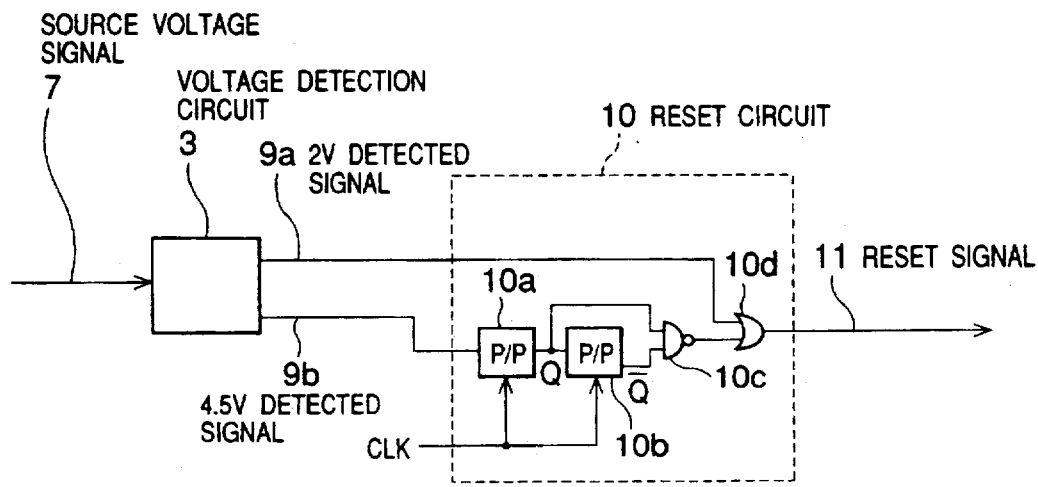
FIG. 2 is a detailed circuit diagram of a reset circuit employed in the first embodiment shown in FIG. 1.

FIG. 2 is a specific circuit diagram of the reset circuit 10. In FIG. 2, the reset circuit 10 is specifically composed of flip-flops 10a and 10b, a NAND circuit 10c and AND circuit 10d. The 2V detected signal 9a output from the voltage detection circuit 8 is supplied to the AND circuit 10d of the reset circuit 10.

Further, the 4.5V detected signal 9b output from the voltage detection circuit 8 is supplied to a data input of the flip-flop 10a of the reset circuit 10. Furthermore, a clock CLK is also supplied to each of the flip-flops 10a and 10b. The reset circuit 10 outputs a reset signal 11 from the output of the AND circuit 10d based on these signals and supplies it to the interface/control circuit 4.

Figure 3:
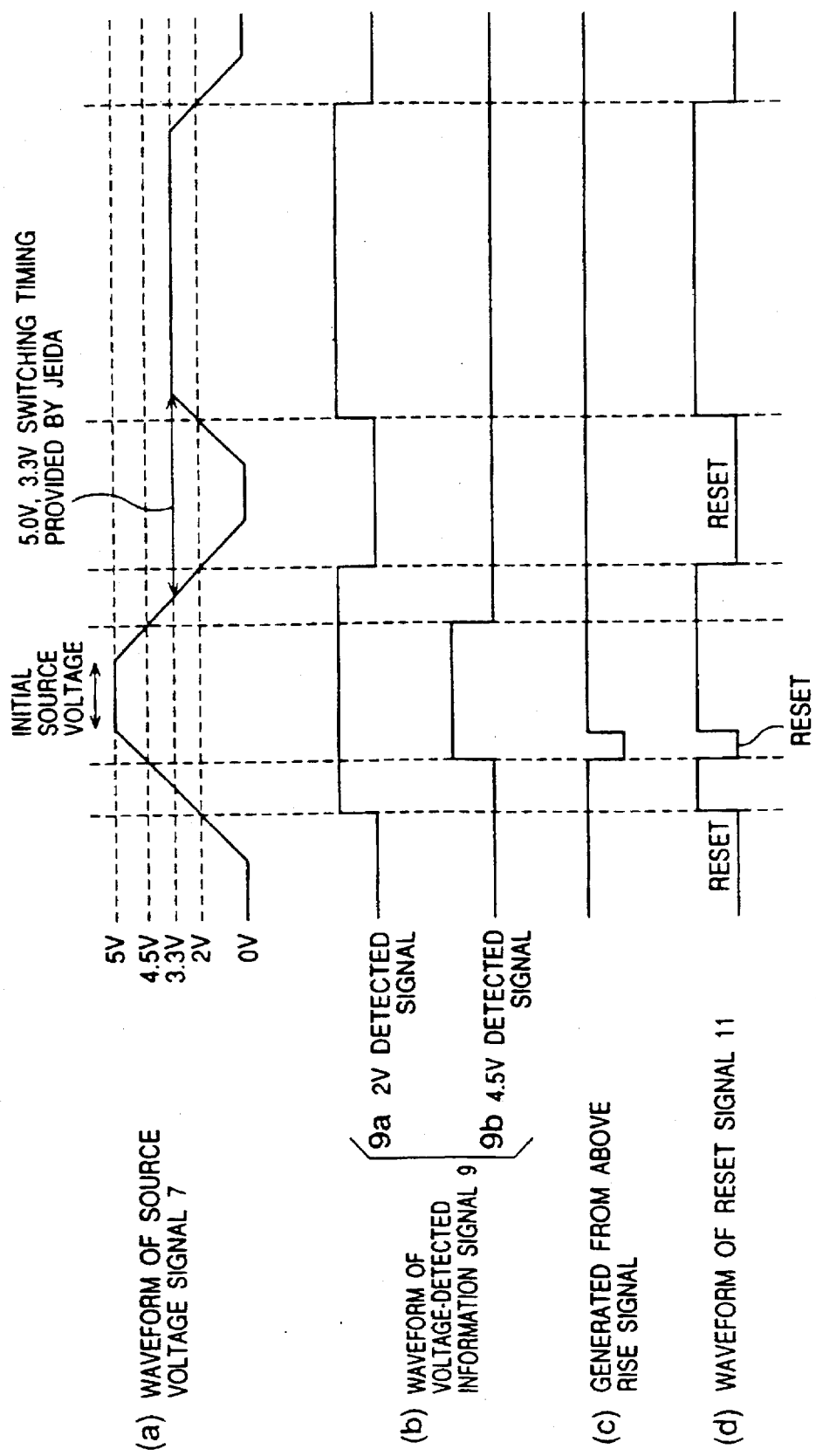
FIG. 3 is a waveform chart for describing the operation of the personal-computer system shown in FIG. 1.
Figure 4:
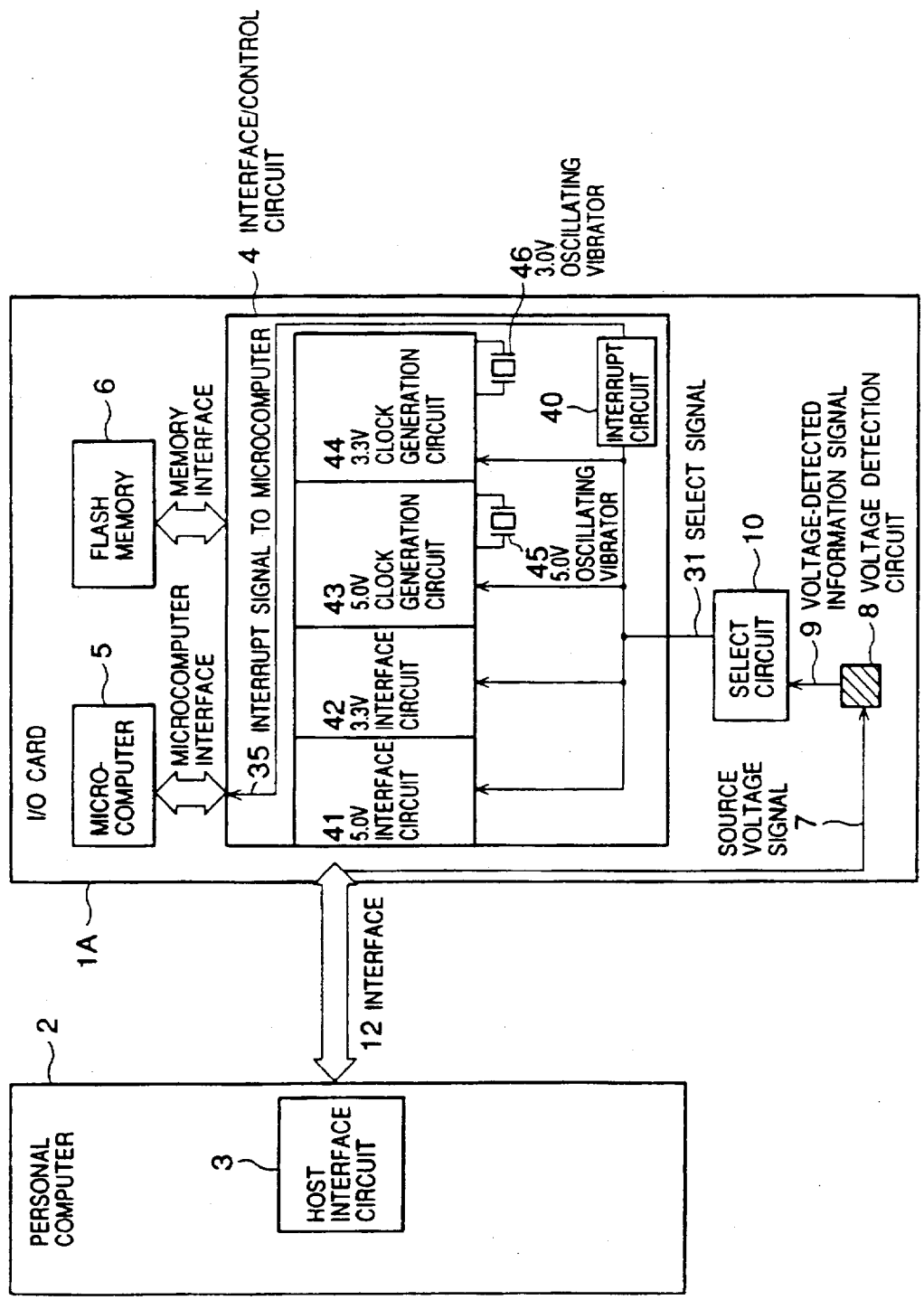
FIG. 4 is a functional configuration view of a personal-computer system illustrating a second embodiment.

FIG. 3 is a waveform chart for describing the operation of the personal-computer system according to the first embodiment.

When the I/O card 1 having a dual operating voltage is activated, a signal at a Vsense pin that exists in the interface 12, is first read from the personal computer 12 side. Next, an initial source voltage signal for the I/O card 1 is set to 5V and the I/O card 1 is firstly activated under 5V. Thereafter, the source voltage signal is changed to a low source voltage signal 3.3V and the I/O card 1 is activated under the low source voltage signal 3.3V.

The state of a change of the source voltage signal 7 from 5V to 3.3V is represented as shown in FIG. 3(a). The voltage detection circuit 8 outputs the voltage-detected information signal 9 as shown in FIG. 3(b) in response to the change in source voltage signal 7 shown in FIG. 3(a). Namely, the voltage detection circuit 8 outputs the 2V detected signal 9a and the 4.5V detected signal 9b in response to the change in source voltage signal 7. A waveform shown in FIG. 3(c) is created by the NAND 10c of the reset circuit 10 based on the voltage-detected signals 9a and 9b. Hence the reset signal 11 is outputted in the form of a signal shown in FIG. 3(d) so as to be supplied to the interface/control circuit 4.

Namely, the waveform of the reset signal 11 shown in FIG. 3(d) is reset between source voltage signals 0V and 2V applied upon initial operation. Next, the waveform of the reset signal 11 is reset again between 4.5V and 5V prior to the initial source voltage signal 5V. Thereafter, the waveform of the reset signal 11 is reset upon change of the source voltage signal from 5V to 3.3V.

According to the first embodiment, as described above, the I/O card 1 is provided with the voltage detection circuit 8 and the reset circuit 10. Further, the reset circuit 10 generates the reset signal 11 to be supplied to the circuits such as the interface/control circuit 4 of the I/O card 1, etc. Thus, when the source voltage signal 7 changes from 0V to the initial source voltage 5V and from the initial source voltage 5V to the low operating source voltage 3.3V as shown in FIG. 3, the I/O card 1 can be assuredly reset.

As a result, an internal state of the I/O card 1 can be determined. Thus, since a CPU mounted in the personal computer 2 makes it unnecessary to cause the I/O card 1 to write an initial value into the register and other inner circuits provided within the I/O card 1 after the source voltage signal has been changed, the time required to initially set the CPU can be shortened and a processing burden imposed on the CPU can be reduced.

[Second Embodiment]

In the first embodiment, the reset circuit has been used to stabilize the states of the register and the inner circuits provided within the I/O card in response to the change in source voltage signal. In the second embodiment, however, an I/O card 1A is realized which is capable of optimizing an interface with a personal computer and an operating frequency based on a source voltage signal and stabilizing its internal state based on a voltage-detected information signal 9 outputted from a voltage detection circuit 8.

The I/O card 1A is different in characteristic from the I/O card 1 according to the first embodiment in that a selector circuit 30 for taking in or capturing the voltage-detected information signal 9 outputted from the voltage detection circuit 8 and outputting a select signal 31 therefrom is provided. Further, an interface/control circuit 4 is characterized by comprising a 5.0V interface circuit 41, a 3.3V interface circuit 42, a 5.0V clock generation circuit 43, a 3.3V clock generation circuit 44 and an interrupt circuit 40.

Incidentally, the 5.0V clock generation circuit 43 includes a 5.0V oscillating vibrator 45. Further, the 3.3V clock generation circuit 44 also includes a 3.3V oscillating vibrator 46.

The select signal 31 output from the select circuit 30 is supplied to the 5.0V interface circuit 41, the 3.3V interface circuit 42, the 5.0V clock generation circuit 43, the 3.3V clock generation circuit 44 and the interrupt circuit 40 of the interface/control circuit 4. Further, the interrupt circuit 40 generates an interrupt signal 35 from the select signal 31 and supplies it to a microcomputer 5. The microcomputer 5 interrupts the interface/control circuit 4 while the interface circuits 41 and 42 and the clock generation circuits 43 and 44 are selected based on the select signal 31.

Figure 5:
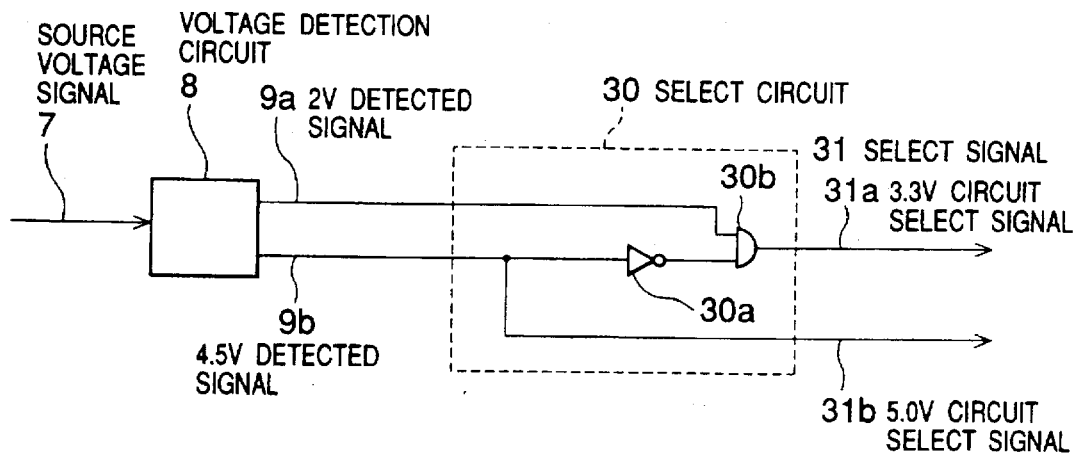
FIG. 5 is a functional configuration view of a select circuit employed in the second embodiment shown in FIG. 4.

(Select Circuit 30):

FIG. 5 is a view showing a specific circuit configuration of the select circuit 30. Referring to FIG. 5, a 2V detected signal 9a output from the voltage detection circuit 8 is supplied to an AND circuit 30b, whereas a 4.5V detected signal 9b output therefrom is supplied to an inverter 30a. The 4.5V detected signal 9b is output as a 5.0V circuit select signal 31b. A signal output from the inverter 30a is supplied to the AND circuit 30b from which an AND output signal is output as a 3.3V circuit select signal 31a.

Figure 6:
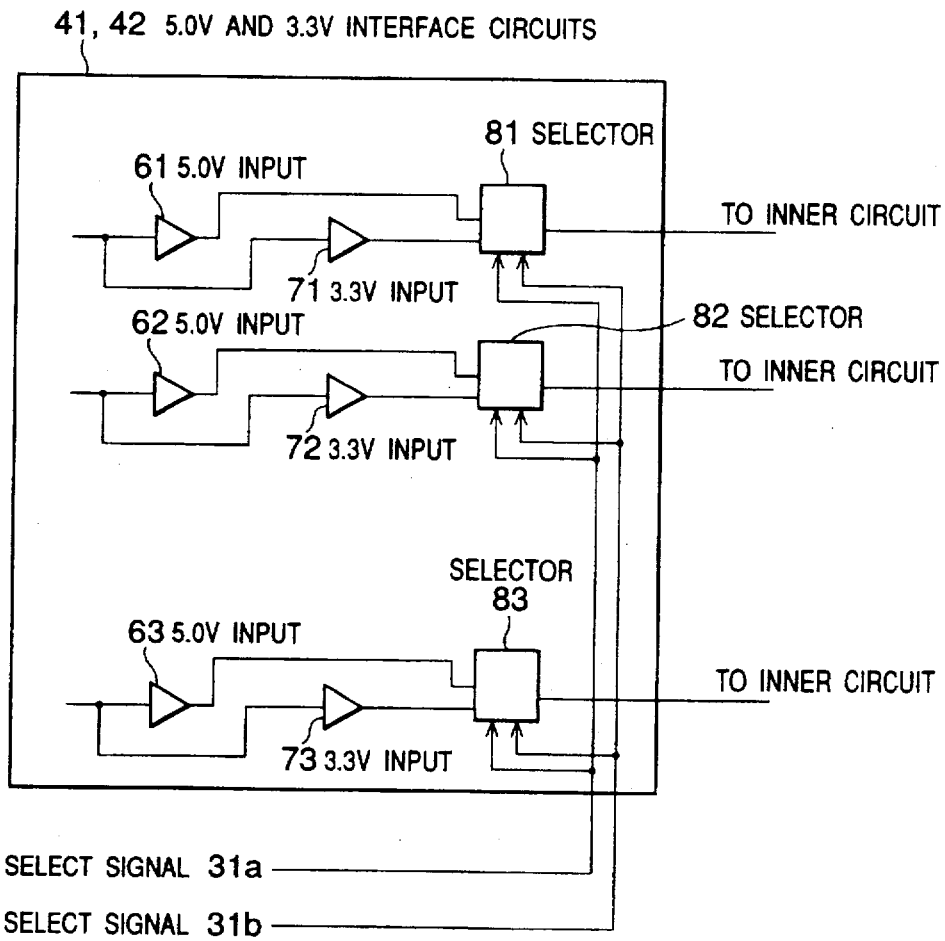
FIG. 6 is a functional configuration view of an interface circuit employed in the second embodiment shown in FIG. 4.

(5.0V Interface Circuit 41 and 3.3V Interface Circuit 42):

FIG. 6 is a view illustrating specific circuit configurations of the 5.0V interface circuit 41 and the 3.3V interface circuit 42. Referring to FIG. 6, the 5.0V interface circuit 41 and the 3.3V interface circuit 42 respectively include 5.0V input buffers 61 through 63, which amplify signals sent from the interface 12. Signals output from the 5.0V input buffers 61 through 63 are supplied to their corresponding selectors 81 through 83. Further, the 5.0V and 3.3V interface circuits 41 and 42 respectively include 3.3V input buffers 71 through 73, which receive the signals from the interface 12. Signals output from the 3.3V input buffers 71 through 73 are also supplied to their corresponding selectors 81 through 83.

The selectors 81 through 83 supply signals respectively selected based on the 3.3V circuit select signal 31a and the 5.0V circuit select signal 31b output from the selector circuit 30, to their corresponding inner circuits.

Figure 7:
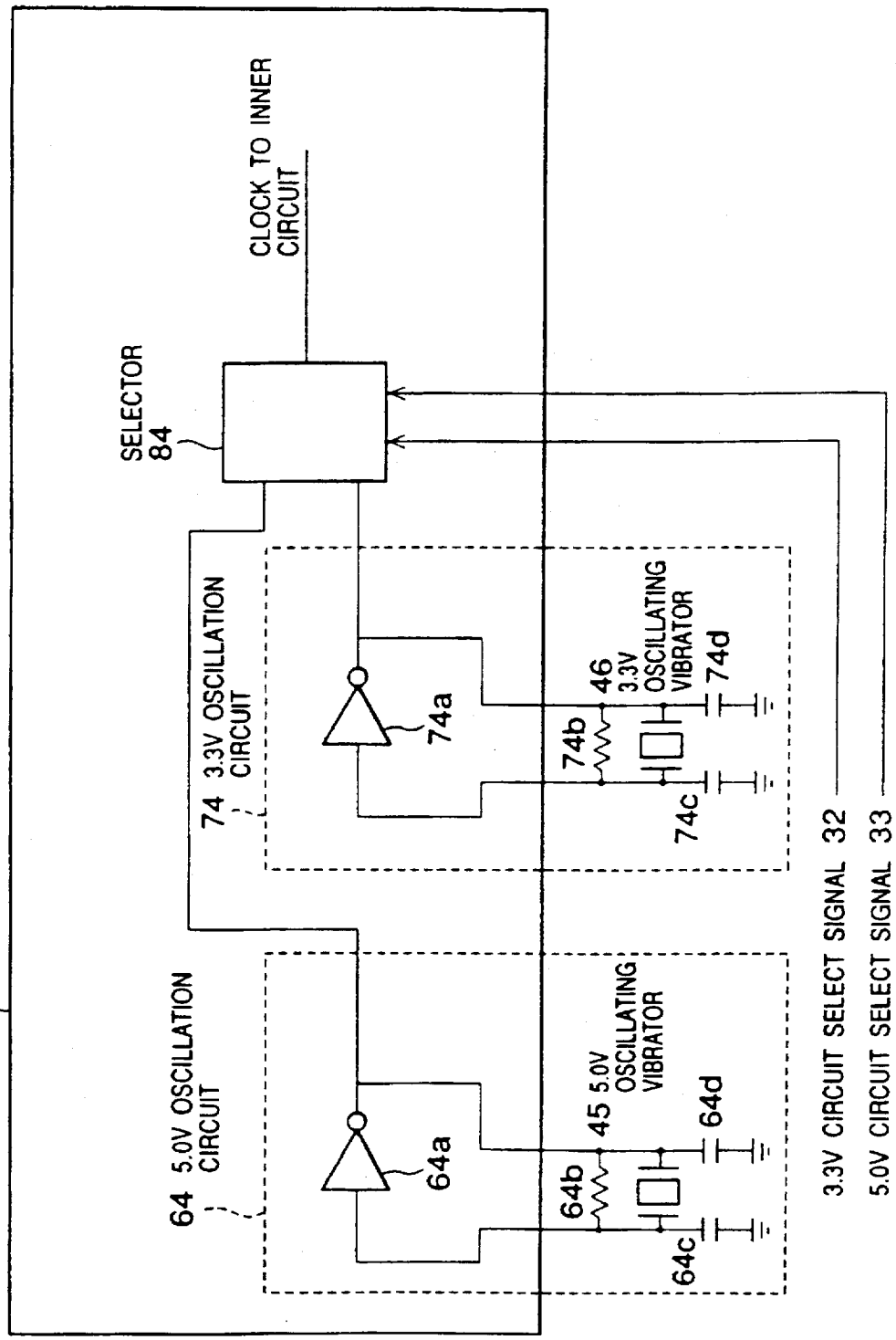
FIG. 7 is a functional configuration view of a clock generation circuit employed in the second embodiment shown in FIG. 4.

(5.0V Clock Generation Circuit 43 and 3.3V Clock Generation Circuit 44):

FIG. 7 is a view showing specific circuit configurations of the 5.0V clock generation circuit 43 and the 3.3V clock generation circuit 44. Referring to FIG. 7, a 5.0V oscillation circuit 64 oscillates at a predetermined frequency using a 5.0V oscillating vibrator 45, an inverter 64a, a resistor 64b and capacitors 64c and 64d. An oscillated signal is supplied to a selector 84.

Further, a 3.3V oscillation circuit 74 oscillates at a predetermined frequency using a 3.3V oscillating vibrator 46, an inverter 74a, a resistor 74b and capacitors 74c and 74d. An oscillated signal is supplied to the selector 84.

In response to the 3.3V circuit select signal 31a and the 5.0V circuit select signal 31b output from the select circuit 30, the selector 84 outputs either one of the oscillated signals to its corresponding inner circuit as a system clock.

FIG. 8 is a waveform chart for describing the operation of the personal computer according to the second embodiment. Referring to FIG. 8, a waveform chart of FIG. 8(a) for describing variations in source voltage signal 7 and a waveform chart shown in FIG. 8(b), of the voltage-detected information signal 9 are similar to those shown in FIGS. 3(a) and 3(b) of FIG. 3. The select circuit 30 generates the 5.0V circuit select signal 31b shown in FIG. 8(c) and the 3.3V circuit select signal 31a shown in FIG. 8(d) in response to the voltage-detected information signal 9 shown in FIG. 8(b) and supplies them to the interface/control circuit 4.

The 5.0V input and the 5.0V oscillated-signal output or the 3.3V input and the 3.3V oscillated-signal output are selected by the selector 81 through 83 of the 5.0V and 3.3V interface circuits 41 and 42 supplied with the 5.0V circuit select signal 31b shown in FIG. 8(c) and the 3.3V circuit select signal 31a shown in FIG. 8(d) and the selector 84 of the 5.0V and 3.3V clock generation circuits 43 and 44 supplied with the 5.0V circuit select signal 31b and the 3.3V circuit select signal 31a.

In the second embodiment, the 3.3V input and the 3.3V oscillated-signal output are selected when the source voltage signal 7 ranges between 2V and 4.5V. When the source voltage signal 7 is greater than or equal to 4.5V, the 5.0V input and the 5.0V oscillated-signal output are selected.

(Effects of Second Embodiment)

The second embodiment described above can bring about advantageous effects that since the select circuit 30 is provided within the I/O card 1A, the input interface and clock generation optimal to the source voltage signal 7 can be carried out by generating the select signals 31a and 31b using the voltage-detected information signal 9 detected and produced by the voltage detection circuit 8 in response to the voltage variation in source voltage signal 7.

Accordingly, the state of the inner circuits in the I/O card 1A can be stabilized and determined even if the source voltage signal varies.

Therefore, the internal state of the I/O card 1A can be determined. Thus, since the CPU provided within the personal computer 2 makes it unnecessary for the I/O card 1A to write the initial value into the register and other inner circuits provided within the I/O card 1A after the change in source voltage signal, an initialization time of the CPU can be shortened and the processing burden imposed on the CPU can be reduced.

In the aforementioned embodiments, 5.0V and 3.3V have been used as the source voltage signal. As an alternative, however, other source voltage signal may be applied by varying the level of a detected voltage.

Further, the aforementioned second embodiment describes the case where the input of the interface circuit is used as an example. However, the output of the interface circuit may be applied if the same select signal is used.

Furthermore, the aforementioned embodiments describe the case where the personal computer 2 is used as a host device. However, other various devices may be adopted as the host device. The host device may be an information processor, a measuring device, a storage device, a display unit, a printer device, etc.

Still further, any one of a serial interface, a parallel interface, etc. can be applied between the host device and the I/O card or IC memory card.

Still further, various devices such as a disk card, a RAM card, a ROM card, an arithmetic card, a modem card, a cassette device, a board, a module, a unit (such as a hard disk unit), etc. can be adopted as objective devices to be connected as well as the I/O card and the IC memory card.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. An internal state determining apparatus for use with an accessory card having a plurality of inner circuits, the apparatus comprising:

detecting means for detecting a change in voltage supplied to the accessory card from an external device and for outputting a detected signal in response to the detected change in voltage;

a plurality of clock generators for producing clock signals different from one another;

a plurality of interface circuits for receiving a signal input to the accessory card from the external device and for respectively supplying internal signals to said plurality of inner circuits; and internal state determining means for selecting one of said plurality of interface circuits in response to the detected signal and for causing said plurality of inner circuits to be in an associated predetermined state;

wherein said detecting means selectively receives first and second voltages from the external device and outputs corresponding first and second detected signals in response to the first and second voltages, and wherein said detecting means detects that the second voltage has been received after receipt of the first voltage, said internal state determining means selects changes from one of said plurality of clock generators to another one of said plurality of clock generators and switches from one of said plurality of interface circuits to another one of said plurality of interface circuits, thereby determining that said inner circuits are in an associated predetermined state.

2. An internal state determining apparatus for use with peripheral circuitry to determine that the peripheral circuitry assumes one of a plurality of possible internal states, the apparatus comprising:

an interface control circuit activated by a first voltage and subsequently activated by a second voltage, the first and second voltages being supplied to the interface control circuit from an external device which is external to the peripheral circuitry, the interface control circuit being in a predetermined state before being supplied with the first and second voltages;

voltage detecting means for detecting a change from the first voltage to the second voltage, and for outputting a voltage detected signal in response to the change in voltage; and internal state determining means for producing a reset signal to the interface control circuit in response to the voltage detected signal for resetting the interface control circuit to the predetermined state:

wherein the voltage detected signal comprises first and second signals each having a first level and a second level, and wherein the internal state determining means outputs the reset signal to the interface control circuit when the first and second signals both have the same level.

3. An internal state determining apparatus according to claim 2, wherein the interface control circuit comprises first and second clock generators, first and second interface circuits, and selecting means for selecting between the first and second clock generators and the first and second interface circuits, and wherein:

the voltage detecting means outputs the first signal at the second level when the supplied voltage level exceeds a first predetermined operational voltage, and outputs the second signal at the second level when the supplied voltage level exceeds a second predetermined operational voltage, and the selecting means selects the first clock generator and the first interface circuit in response to the first signal being at the second level, and selects the second clock generator and the second interface circuit in response to the second signal being at the second level.

4. An internal state determining apparatus for use with peripheral circuitry according to claim 2, wherein the peripheral circuitry is disposed on a personal computer memory card.

5. An internal state determining apparatus for use with peripheral circuitry according to claim 2, wherein the peripheral circuitry is disposed on a personal computer input/output card.

6. An internal state determining apparatus for use with peripheral circuitry according to claim 2, wherein the first voltage corresponds to a nominal supply voltage of 3.3 volts, and wherein the second voltage corresponds to a nominal supply voltage of 5.0 volts.

7. An internal state determining apparatus for use with peripheral circuitry according to claim 2, wherein the peripheral circuitry includes at least one integrated circuit and wherein the at least one integrated circuit is reset to an initial state by the reset signal.

8. An internal state determining apparatus for use with peripheral circuitry according to claim 7, wherein the at least one integrated circuit includes a microcomputer.

9. An internal state determining apparatus for use with peripheral circuitry according to claim 7, wherein the at least one integrated circuit includes a flash memory device.

10. An internal state determining apparatus for use with peripheral circuitry according to claim 7, wherein the at least one integrated circuit includes a microcomputer and a flash memory device.

11. An internal state determining apparatus for use with a peripheral device to determine that the peripheral device assumes one of a plurality of possible internal states, the apparatus comprising:
  an inner circuit of the peripheral device which is activated by a first voltage and subsequently activated by a second voltage, the first and second voltages being supplied to the inner circuit from an external device which is external to the peripheral device, the inner circuit being in a predetermined state before being supplied with the first and second voltages;
  an interface control circuit operatively coupled to the inner circuit and having:
    a plurality of clock generators for generating clock signals which are different from one another, and which are selectively supplied to the inner circuit; and
    a plurality of interface circuits for receiving signals input from the external device and respectively selectively supplying internal signals to the inner circuit;
  voltage detecting means for detecting a change from the first voltage to the second voltage, and for outputting a voltage detected signal in response to the change in voltage; and
  internal state determining means for selecting one of the plurality of clock generators and for selecting one of the plurality of interface circuits, in response to the voltage detected signal, and thereby causing the interface control circuit to output a selected clock signal and selected internal signals to the inner circuit.

12. An integrated circuit card which has two activation states corresponding to two voltages, comprising:
  a first circuit activated by a first voltage and subsequently activated by a second voltage, both the first and second voltages being supplied from an external host system, external to the integrated circuit card, the first circuit having a predetermined state before being supplied with the first and second voltages;
  a detecting circuit for detecting a change from the first voltage to the second voltage, and for outputting a voltage detected signal in response to the change of voltage; and
  an internal state determining circuit for providing a reset signal to the first circuit in response to the voltage detected signal for resetting the first circuit to the predetermined state:
    wherein the voltage detected signal comprises first and second signals each having a first level and a second level, and wherein the internal state determining circuit outputs the reset signal to the first circuit when the first and second signals both have the same level.

13. The integrated circuit card according to claim 12, wherein the first circuit comprises first and second clock generators, first and second interface circuits, and a selecting circuit for selecting between the first and second clock generators and the first and second interface circuits, and wherein:
  the detecting circuit outputs the first signal at the second level when the supplied voltage level exceeds a first predetermined operational voltage, and outputs the second signal at the second level when the supplied voltage level exceeds a second predetermined operational voltage, and
  the selecting circuit selects the first clock generator and the first interface circuit in response to the first signal being at the second level, and selects the second clock generator and the second interface circuit in response to the second signal being at the second level.

14. The integrated circuit card according to claim 12, wherein the integrated circuit card includes at least one integrated circuit and wherein the at least one integrated circuit is reset to an initial state by the reset signal.

15. The integrated circuit card according to claim 14, wherein the at least one integrated circuit includes a microcomputer.

16. The integrated circuit card according to claim 14, wherein the at least one integrated circuit includes a flash memory device.

17. The integrated circuit card according to claim 14, wherein the at least one integrated circuit includes a microcomputer and a flash memory device.

18. The integrated circuit card according to claim 12, wherein the integrated circuit card comprises a personal computer memory card.

19. The integrated circuit card according to claim 12, wherein the integrated circuit card comprises a personal computer input/output card.

20. The integrated circuit card according to claim 12, wherein the first voltage corresponds to a nominal supply voltage of 3.3 volts, and wherein the second voltage corresponds to a nominal supply voltage of 5.0 volts.

21. A storage device adapted for connecting with an external host device and being provided with a supply voltage from the external host device, comprising:
  a memory for storing data;
  an interface/control circuit for controlling data transfer between the external host device and the memory;
  a voltage detection circuit for detecting a change in the supply voltage level, and for outputting a first voltage detected signal when the supply voltage level exceeds a first predetermined operational voltage level, and for outputting a second voltage detected signal when the supply voltage level exceeds a second predetermined operational voltage level; and
  a reset circuit for resetting the interface/control circuit in response to a coincidence of the first and second voltage detected signals respectively.

22. An internal state determining apparatus comprising:

an input terminal for receiving a source voltage signal having a voltage value between first and second voltage levels;

a detecting circuit operatively coupled to the input terminal, for outputting at least one detected signal during a first period when the voltage value of the voltage source is at or between the first voltage level and a third voltage level, and during a second period when the voltage value of the source voltage is at or between the third voltage level and the second voltage level, the third voltage level being a voltage level between the first voltage and the second voltage levels; and a reset circuit operatively coupled to the detecting circuit, for outputting a reset signal in dependence on the at least one detected signal.

23. An internal state determining apparatus according to claim 22, wherein the second voltage level is a voltage level higher than the first voltage level.

24. An internal state determining apparatus according to claim 22, wherein the at least one detected signal comprises first and second detected signals.

25. An internal state determining apparatus according to claim 24, wherein the reset circuit outputs the reset signal when the first detected signal has a voltage level which is substantially equal to a voltage level of the second detected signal.

26. An internal state determining apparatus according to claim 24, wherein the first detected signal is generated when the source voltage is a voltage at or between a fourth voltage level and the second voltage level, and wherein the second detected signal is generated when the source voltage is a voltage at or between a fifth voltage level and the second voltage level, the fourth voltage level being a voltage level between the first voltage level and the third voltage level, the fifth voltage level being a voltage level between the third voltage level and the second voltage level.

27. An internal state determining apparatus according to claim 22, wherein the internal state determining apparatus is disposed on a card having a memory and an interface circuit, and wherein the interface circuit interfaces an external device with the memory and resets in response to the reset signal.

28. An internal state determining apparatus for use with a device having a plurality of inner circuits, the apparatus comprising:

an input terminal for receiving a source voltage signal having a voltage value between first and second voltage levels;

a detecting circuit operatively coupled to the input terminal, for outputting at least one detected signal during a first period when the voltage value of the voltage source is at or between the first voltage level and a third voltage level, and during a second period when the voltage value of the source voltage is at or between the third voltage level and the second voltage level, the third voltage level being a voltage level between the first voltage and the second voltage levels;

an interface control circuit operatively coupled to the plurality of inner circuits and having:

a plurality of clock generators for generating clock signals which are different from one another, and which are selectively supplied to the plurality of inner circuits; and a plurality of interface circuits for receiving signals input through the input terminal and respectively selectively supplying internal signals to the plurality of inner circuits; and a select circuit for selecting one of the plurality of clock generators and one of the plurality of interface circuits, in response to the detected signal.

29. An internal state determining apparatus according to claim 28, wherein the second voltage level is a voltage level higher than the first voltage level.

30. An internal state determining apparatus according to claim 28, wherein the at least one detected signal comprises first and second detected signals.

31. An internal state determining apparatus according to claim 30, wherein the first detected signal is generated when the source voltage is a voltage at or between a fourth voltage level and the second voltage level, and wherein the second detected signal is generated when the source voltage is a voltage at or between a fifth voltage level and the second voltage level, the fourth voltage level being a voltage level between the first voltage level and the third voltage level, the fifth voltage level being a voltage level between the third voltage level and the second voltage level.

32. An internal state determining apparatus according to claim 31, wherein the select circuit outputs first and second selecting signals for selecting one of the plurality of clock generators and one of the plurality of interface circuits.

33. An internal state determining apparatus according to claim 32, wherein the select circuit outputs the first selecting signal when a voltage level of the first detected signal is different from a voltage level of the second detected signal, and outputs the second selecting signal in response to the second detected signal.

34. An internal state determining apparatus for use with a device having a plurality of inner circuits according to claim 28, wherein the interface control circuit includes an interrupt circuit for interrupting at least one of the plurality of inner circuits of the device.

* * * * *